(12) United States Patent
Peter

(10) Patent No.: US 9,908,222 B2
(45) Date of Patent: Mar. 6, 2018

(54) SEED FIRMER LIFE EXTENDER

(71) Applicant: Flo-Rite, Inc., Hicksville, OH (US)

(72) Inventor: Jeffrey J. Peter, Hicksville, OH (US)

(73) Assignee: Flo-Rite Inc., Hicksville, OH (US)

( * ) Notice: Subject to any disclaimer, the term of this patent is extended or adjusted under 35 U.S.C. 154(b) by 383 days.

(21) Appl. No.: 14/627,096

(22) Filed: Feb. 20, 2015

(65) Prior Publication Data

US 2016/0008964 A1 Jan. 14, 2016
US 2016/0361806 A9 Dec. 15, 2016

Related U.S. Application Data

(63) Continuation-in-part of application No. 14/012,246, filed on Nov. 4, 2013, now Pat. No. 9,565,797, and a continuation-in-part of application No. 13/862,698, filed on Apr. 15, 2013, now abandoned.

(60) Provisional application No. 61/942,225, filed on Feb. 20, 2014, provisional application No. 61/642,004, filed on May 3, 2012, provisional application No. 62/018,173, filed on Jun. 27, 2014.

(51) Int. Cl.
*B25B 27/02* (2006.01)
*A01C 5/06* (2006.01)
*A01C 7/20* (2006.01)

(52) U.S. Cl.
CPC .............. *B25B 27/02* (2013.01); *A01C 5/068* (2013.01); *A01C 7/20* (2013.01)

(58) Field of Classification Search
USPC .......................................................... 29/270
See application file for complete search history.

(56) References Cited

U.S. PATENT DOCUMENTS

| 1,064,400 | A | * | 6/1913 | Timmins | ............... | B25B 27/023 |
| | | | | | | 29/259 |
| 1,447,768 | A | * | 3/1923 | Dover | ................... | B25B 27/023 |
| | | | | | | 29/261 |
| 4,274,189 | A | * | 6/1981 | Conover | ............... | B25B 27/062 |
| | | | | | | 29/256 |
| 6,266,861 | B1 | * | 7/2001 | Chen | ..................... | B25B 27/064 |
| | | | | | | 29/252 |
| 8,517,365 | B2 | * | 8/2013 | Velez | ...................... | B25B 5/147 |
| | | | | | | 269/140 |
| 8,528,888 | B2 | * | 9/2013 | Header | ................... | E04D 13/10 |
| | | | | | | 269/91 |
| 8,910,928 | B2 | * | 12/2014 | Header | .................. | E04D 13/10 |
| | | | | | | 269/91 |
| 9,565,797 | B2 | * | 2/2017 | Peter | ........................ | A01C 7/08 |

* cited by examiner

*Primary Examiner* — George Nguyen
(74) *Attorney, Agent, or Firm* — Kevin R. Erdman; Brannon Sowers & Cracraft PC

(57) ABSTRACT

The present invention involves a manipulator tool for use with a seed firmer having an extender attachment capable of engagement with a groove of the seed firmer. The tool facilitates the engagement and removal of the extender attachment by rotation of a rod in a bracket, which may be manual or with a power tool. The manipulator tool may be used on seed firmers which have been removed from a planting machine or are still attached to a planting machine.

20 Claims, 17 Drawing Sheets

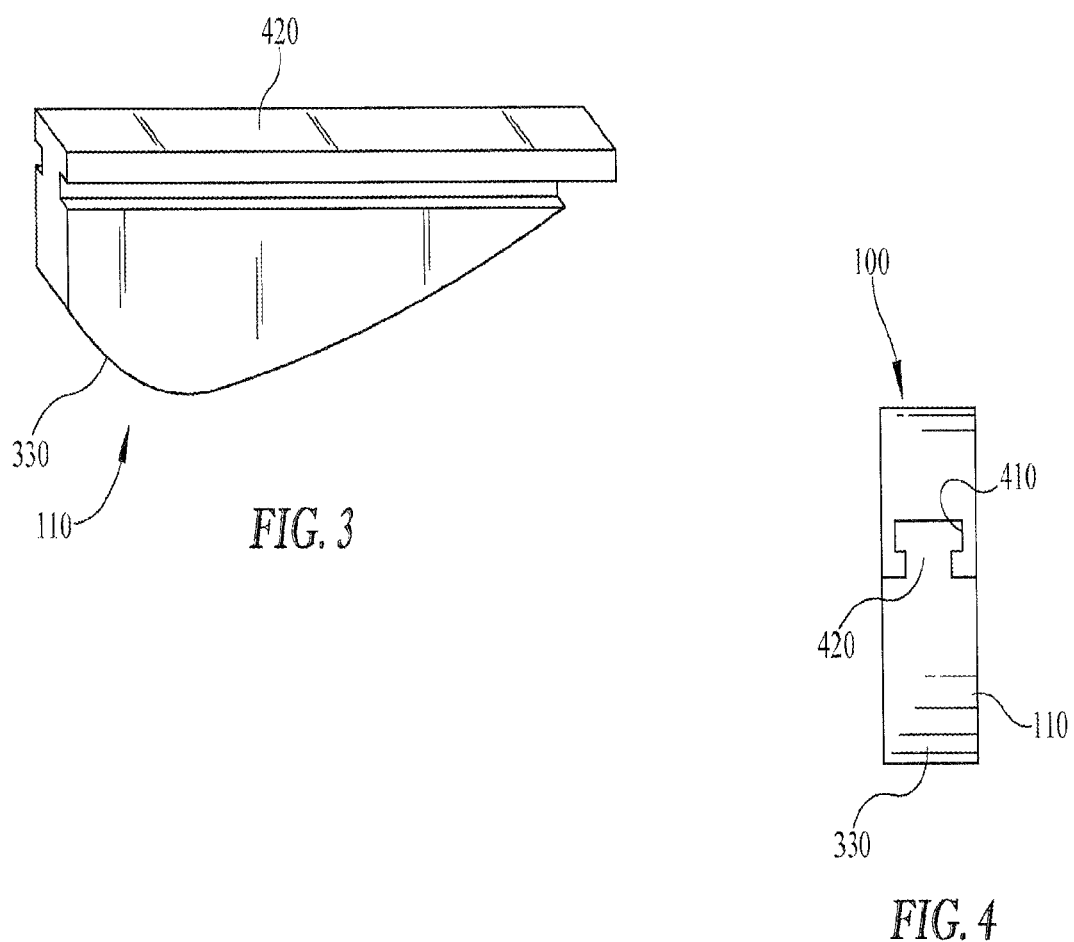

SEED FIRMER LIFE EXTENDER

CROSS-REFERENCE TO RELATED APPLICATIONS

The present application claims priority under 35 U.S.C. §119(e) of U.S. Patent Provisional Application Ser. No. 61/642,004, filed May 3, 2012, and is a continuation-in-part of co-pending U.S. patent application Ser. Nos. 13/382.698 and 14/012,246, filed Apr. 15, 2013, and Nov. 4, 2013, respectively, and to U.S. Patent Provisional Application Ser. No. 61/942,225 filed Feb. 20, 2014 and to U.S. Patent Provisional Application Ser. No. 62/018,173 filed Jun. 27, 2014, the disclosures of which are incorporated herein by reference.

BACKGROUND

Field of the Invention

The invention relates to agricultural planting implements. More specifically, the field of the invention is that of seed firmers.

Description of the Related Art

Seed firmers are known and used extensively in agricultural planting systems. Such firmers add to the expense of a planting implement but are thought to more than pay for themselves in terms of increased yield. U.S. Pat. No. 5,425,318 describes one type of seed firmer; U.S. Pat. Nos. 5,730,074, 5,852,982, 6,082,274, and 6,220,191 describe seed firmers having liquid dispensing arrangements; and U.S. Pat. No. 7,497,174 describes a mounting system for seed firmers, the disclosures of all those noted U.S. patents are explicitly incorporated by reference herein. Complicated mounting systems and bracket devices are used to mount the firmers on planters for use during the planting season, typically attached to the seed chute. Improvements in the cost and performance of the firmer are always welcomed.

SUMMARY

The present invention is a seed firmer tool which provides a mechanism for engaging and disengaging the replaceable tip or end that extends the life of the firmer. The seed firmer generally has two components that degrade with use, the flexible arm and the embedding pusher. The flexible arm generally lasts much longer than the embedding pusher portion because the pusher wears against the ground and eventually wears away. Embodiments of the invention include an embedding pusher portion that has a stop and a guide for accepting a replaceable extender. Other embodiments include an embedding pusher portion that engages the rest of the firmer arm. Thus, the portion of the firmer that wears down may be easily replaced which extends the life of the firmer, multiple times over the useful life of the flexible arm. To replace spent extenders, the inventive tool provides the guided force necessary.

In one embodiment, the end of the firmer has a slot that is bounded by a stop portion. The embedding pusher attachment slides into the slot and abuts the stop portion. The bottom of the embedding pusher operates in a conventional manner pushing the seed downwardly into the ground to thus embed the seed in the soil. During the usable life of the firmer, the flexible portion may operate on several embedding pusher attachments. In another embodiment, the embedding end is attached to the flexible arm, with the pusher attachment detactably extending from the embedding arm. In further embodiment, the arm of the attachment portion of the firmer has a connecting portion that attaches to a replaceable embedding element.

The embodiments of the firmer of the present invention optionally provide a passageway for fluid to be dispensed proximate the end of the firmer. The end of the passageway includes a directional attachment that directs fluid in relation to the end of the firmer. Other embodiments attach to the planting system either by connection to the seed tube, or connection to a mounting bracket on the planter. A further embodiment includes a delivery tube deployed within the walls of the embedding portion, with the end cap of the tube providing alternative passageways for the dispensing of liquid.

In one embodiment, the embedding arm has a width that expands from the width of about a seed at the bottom to double or triple width at the top. This narrowing of the embedding arm provides sufficient structure to support the constant interaction with the soil as the firmer is pulled through rows of plants. The thicker portion of the embedding arm provides sufficient width for the optional liquid delivery pipe or tube.

Many embodiments include an aperture at the end proximate where the seed is embedded. In one embodiment, a plug is used at that end. The plug may include an overhang to protect the hole from accumulation of debris. In one embodiment, the plug may be drilled to create either a straight backward stream of exiting liquid, while in another embodiment the plug may have two or more holes to create several distinct streams of exiting liquid. Another embodiment has a single plug with a through bore for creating the straight backward stream of exiting liquid, with an additional cap with one or more holes that create other angled streams. The cap may be snap fit or otherwise attached over the plug.

The extender portion of the firmer may attach to the pusher portion of the firmer via a variety of physical and mechanical couplings. For example, a peg in hole coupling, a glue based coupling, and a sonic welded coupling are all possible implementations of the invention. In several embodiments, a tongue and groove arrangement is used to couple the extender and the pusher portions. In one embodiment, the extender has a T shaped projection on the surface interfacing with the pusher portion which has a corresponding T-shaped groove to accept the projection and couple the two pieces together. This allows the extender to slide into the groove until abutting the stop. In one further embodiment, the surfaces having the tongue and groove include a further mating bump and depression, arranged so that the engagement of the bump and depression deter further relative movement of the extender and pusher portions. Thus, in several embodiments, the extender may be slid into the groove and snap fit at a precise location.

While the extender is disposed on one end of the firmer, the flexible or pushing portion is disposed at the other end and is adapted to be mounted to the planter in alignment with the seed chute. In one embodiment, the mounting portion of the pushing portion has elements that interfit and complement elements on the seed chute so that the pusher portion is directly aligned with the seed chute. In another embodiment, the pushing portion has a flat mounting end that is configured for engagement with a mounting device for holding a flat flange.

Liquid delivery is provided by a tube and discharge path formed in the firmer. In one embodiment, the solid firmer has a passageway shaped to receive a pipe, in one embodiment a curved pipe. Once the firmer is first molded, the curved pipe is inserted while the firmer material is setting up. One end of the pipe is attached to a tube, typically a plastic tube, to receive liquid (e.g., water, fertilizer, herbicides, and/or insecticides) from a source. In one embodiment, that first end of the pipe has ridges or is gnarled or otherwise roughened to enhance the connection of the tube. The other side of the pipe faces a discharge area of the firmer. An internal channel leads to a discharge passage. In one embodiment, a central discharge passage is straight back of the firmer. In another embodiment, multiple passages are present to direct liquid discharge at an angle to the body of the firmer. In yet another embodiment, a cap may be placed over the central discharge passage to redirect the discharging liquid in various angles.

Other embodiments of the invention include a firmer defined by a pair of sidewalls. The sidewalls hold the liquid tube proximate the end of the firmer, and attach to the mounting end of the firmer. The extender is detachably connected to the sidewalls, and may thus be replaced when sufficiently worn without having to replace the other portions of the firmer.

In yet another embodiment, the mounting portion of the firmer includes the pushing arm, and the end of the pushing arm attaches to the extender/embedding portion of the firmer. The optional liquid pipe may be included in the extender/embedding portion, or may be optionally coupled to the extender/embedding portion.

The present invention, in one form, relates to a seed firmer having a flexible portion and an embedding pusher portion. The flexible portion biases the embedding pusher portion into the soil. The embedding pusher portion includes a slot for receiving an embedding pusher attachment, the stop bounded at the end by a stop portion which retains the embedding pusher attachment as it is drawn over the soil.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 3 is a perspective view of the first embodiment of the extender of the present invention.

FIG. 4 is a side sectional view of the firmer of the first embodiment of the present invention showing the interconnection of the extender and firmer body.

Figure 1:
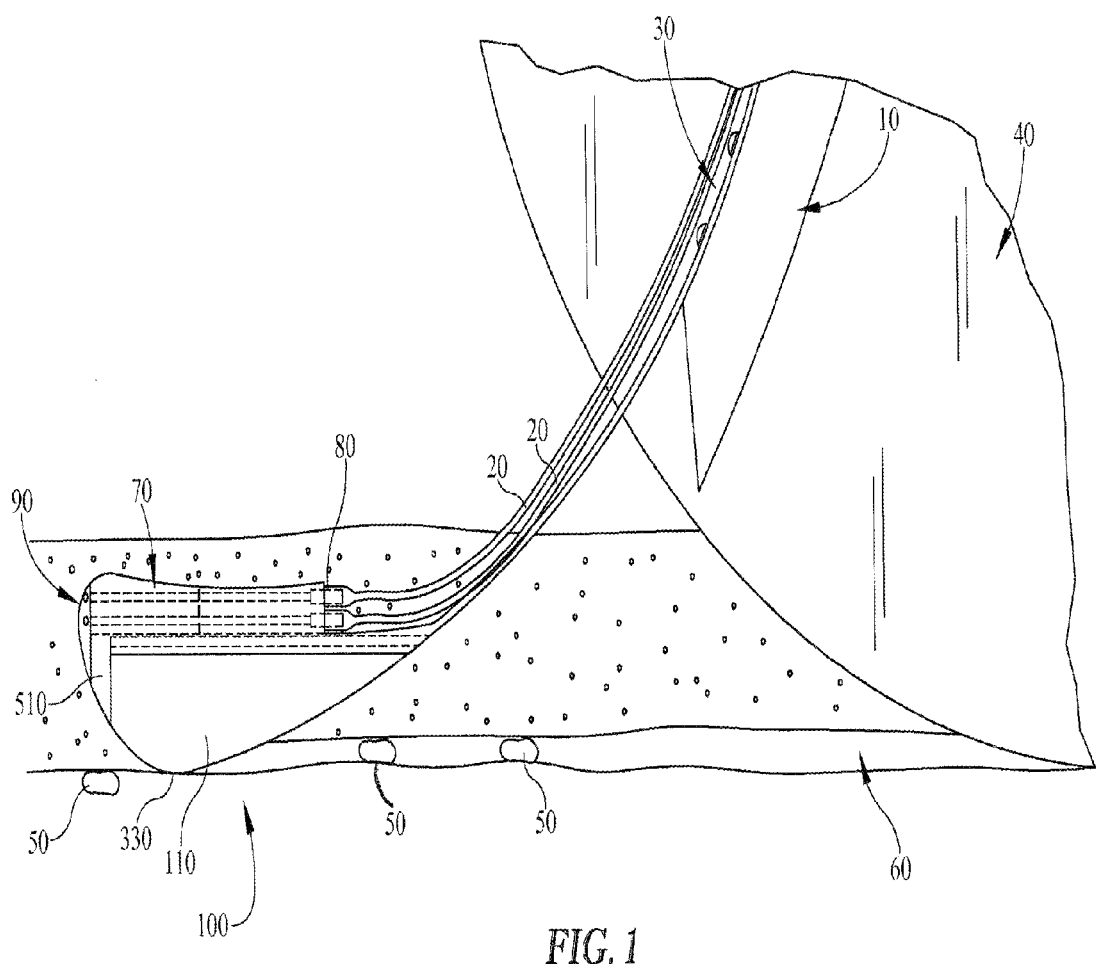
FIG. 1 is a side view of a first embodiment of the firmer of the present invention shown in use.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION

The embodiments disclosed below are not intended to be exhaustive or limit the invention to the precise forms disclosed in the following detailed description. Rather, the embodiments are chosen and described so that others skilled in the art may utilize their teachings.

FIG. 1 shows seed firmer 100 disposed in operation, having embedding pusher portion, or extender, 110 positioned relative to seed chute 10 in a conventional manner. Seed chute 10 is positioned relative to disc 40 by mount 30 so that chute 10 delivers seeds 50 to trough 60, with extender portion 110 being so positioned to embed seeds 50 into the soil of trough 60. Firmer 100 includes interior channel 70 which extends from nipples 80 to end point 90, and is sized to receive tube 20, which in this exemplary embodiment involves conventional liquid tubes that deliver herbicides, fertilizers, pesticides, and/or mixtures of those chemicals to deposit on or near seed 50 once embedded.

Firmer 100 has an attachment portion, extender 110, that is located at a position on firmer 100 that contacts and embeds seeds 50 into the soil defining trough 60. In one embodiment, extender 110 fits into slot 410 in firmer 100 (see FIG. 4), with slot 410 bounded by hard stop portion 510 (see FIG. 5) that retains extender 110 against the direction of movement of firmer 100 over the soil. In this embodiment, extender 110 has tongue 420 having a "T" shape that slideably engages slot 410 so that when not in use, extender 110 may be easily replaced. When firmer 100 is in use, the force subjected to extender 110 urges it into hard stop 510. The exact shape and arrangement of the slideable engagement of slot 410 and tongue 420 may have several variations, for example a circular or arc shaped tongue and slot, or a tongue and slot with several angles.

Extender 110 (see FIG. 3) may be made of conventional materials so that seeds 50 are pressed by the conventional surface and the material wears similarly to conventional firmers. However, once embedding surface 330 wears away so as to diminish the capacity of firmer 100, extender 110 may be replaced. Replacement is made without removing firmer 100 from mount 30. Instead, a farmer may simply slide the old one of extender 110 and slide in a new one. Hard stop 510 limits the range of motion of extender 110, and when firmer 100 is drawn across trough 60 then extender 110 is pressed into hard stop 510.

Figure 2:
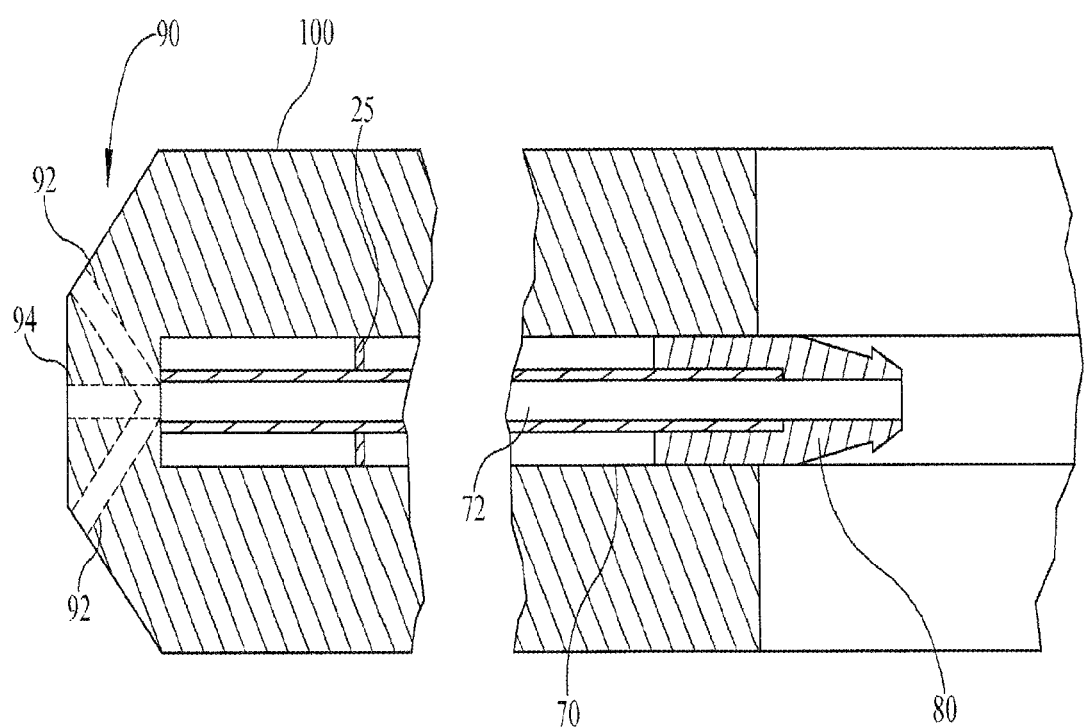
FIG. 2 is a sectional view of FIG. 1 showing a through channel.
Figure 5:
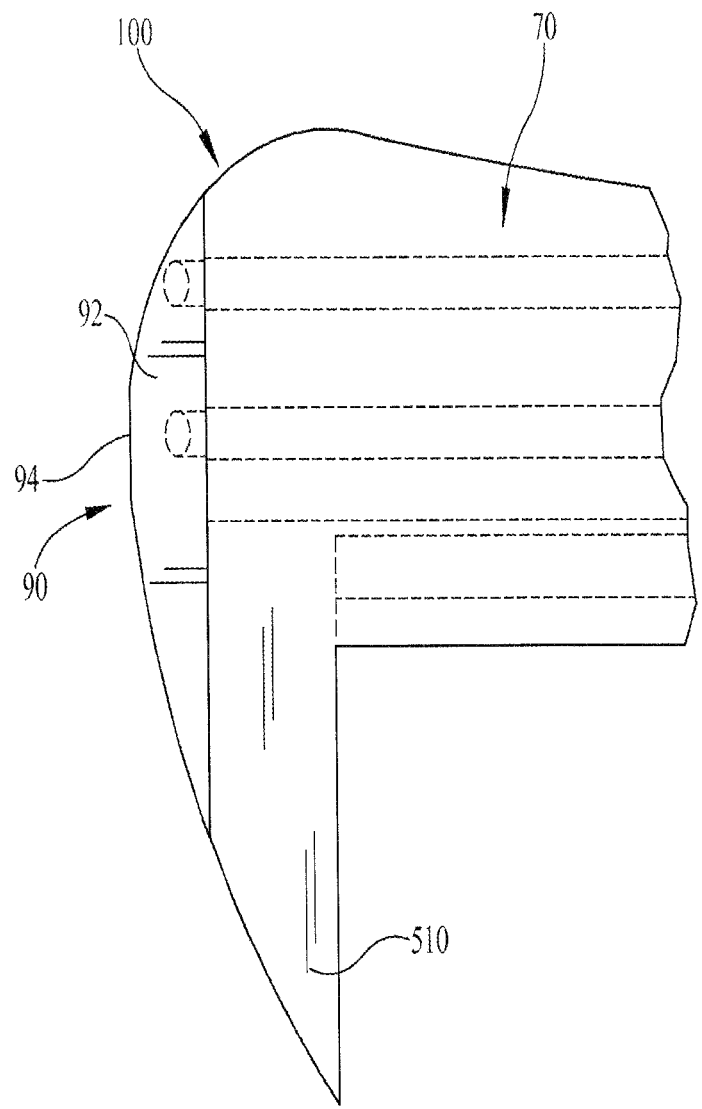
FIG. 5 is a perspective view of an end portion of the first embodiment of the present invention.

Firmer 100 also has an elongated interior channel 70 which is structured and arranged to receive tube 72, which in the disclosed embodiment is a convention liquid delivery tube, for delivering liquid on or near an embedded one of seeds 50 (see FIGS. 2 and 5). An open end of interior channel 70 is configured to receive nipple 80, which serves as a fluid connection between supply tube 20 and interior tube 72. Interior tube 72 is disposed within channel 70 and supported by tube holder 25, which in one embodiment includes a washer-shaped piece having a perimeter roughly congruent to the shape of interior channel 70.

End point 90 may be configured to be an outlet at one end of channel 70, with that end of channel 70 initially manufactured so that end point 90 closes one end of channel 70. This allows customization of a single piece, so that the exit holes may be drilled to suit the particular application. For example, a straight hole in facing surface 94 delivers liquid directly over embedded seed 50 (a "straight shooter"), which may be good for an insecticide, while side surfaces 92 may have holes drilled in them so that liquid is delivered on each side of embedded seed 50 (a "split shooter"), which may be better for fertilizer. In one embodiment (not shown), channel 70 is structured and arranged to accommodate multiple tube so that a series of end points are associated with each tube, allowing for combinations of straight shooters and split shooters in a single seed firmer.

Figure 6:
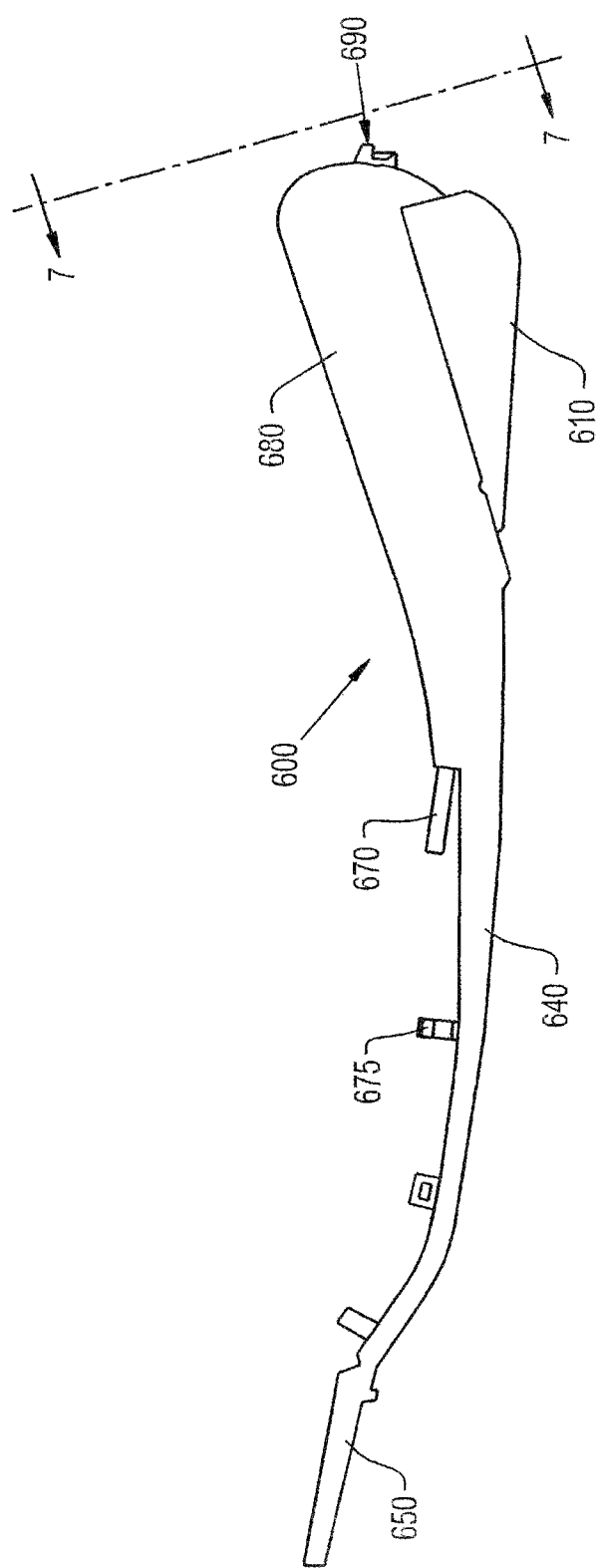
FIG. 6 is a perspective view of a second embodiment of the present invention.
Figure 9:
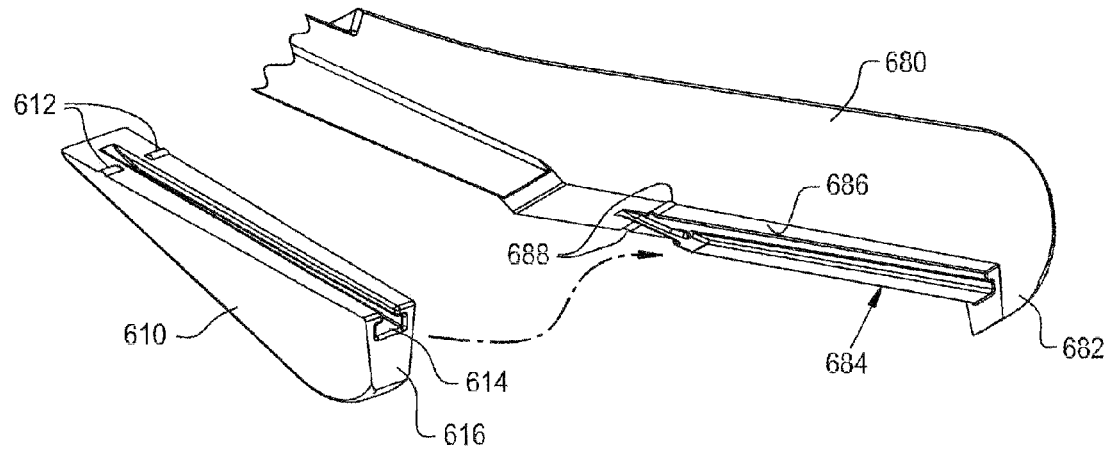
FIG. 9 is an enlarged view of the interconnection of the extender and the firmer body of the second embodiment of the present invention.
Figure 10:
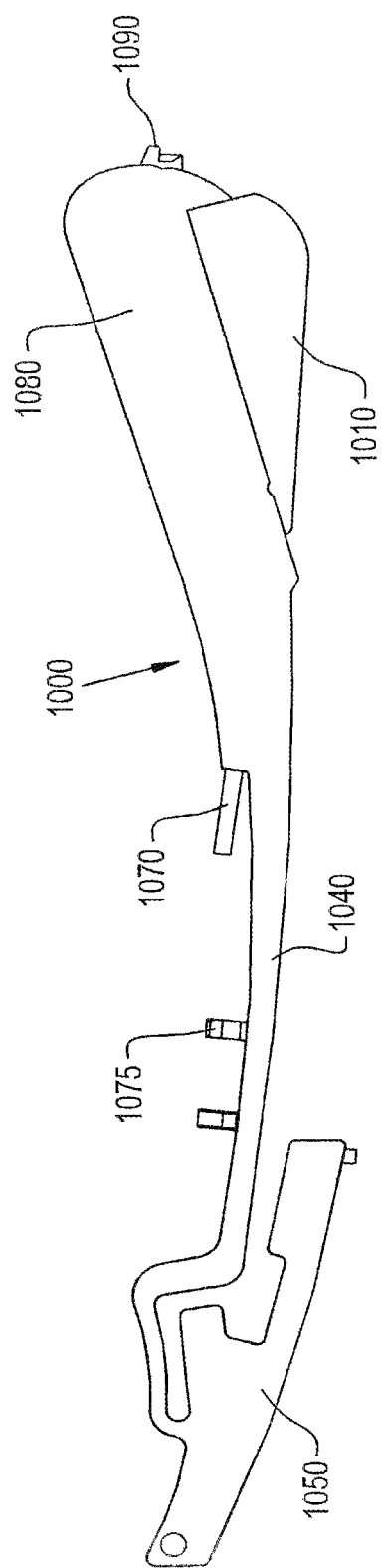
FIG. 10 is a perspective view of a third embodiment of the present invention.

Other embodiments have a tube disposed within the body of the firmer, for example the embodiments of FIGS. 6 and 10. The embodiment of FIG. 6 has flexing portion 640 coupling flat end 650 and embedding arm 680. Pipe 670 extends from embedding portion 680 and extends within portion 680 to spray nozzle 690. Pipe 670 is structured and arranged to receive a flexible tube (not shown) over its exposed end, and may have a roughed, serrated, or ridged surface to further engage the flexible tube. Firmer 600 may also have one or more tube retention pieces 675 to retain the flexible tube with firmer 600. Extender 610 engages embedding arm 680 as shown in FIG. 9 and described below. The embodiment of FIG. 10 has flexing portion 1040 coupling chute end 1050 and embedding arm 1080. Pipe 1070 extends from embedding portion 1080 and extends within portion 1080 to spray nozzle 1090. Pipe 1070 is structured and arranged to receive a flexible tube (not shown) over its exposed end, and may have a roughed, serrated, or ridged surface to further engage the flexible tube. Firmer 1000 may also have one or more tube retention pieces 1075 to retain the flexible tube with firmer 1000. Extender 1010 engages embedding arm 1080 as shown in FIG. 9 and described below.

Embodiments of the inventive firmers of the present application may be mounted on the planting equipment in a variety of ways. In one embodiment, as shown in FIG. 10, firmer 1000 includes seed chute connection portion 1050 structured and arranged to be connected to the exterior mounting of a seed chute (not shown). In another embodiment, shown in FIG. 6, firmer 600 has flat end 650 so that firmer 600 may be attached within a planter bracket assembly similar to that disclosed in the aforementioned U.S. Pat. No. 7,497,174. Embodiments disclosed in the present application may be adapted to either mounting style.

Figure 7:
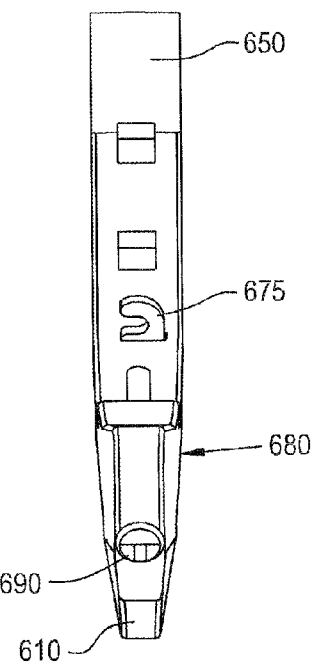
FIG. 7 is an enlarged view of the liquid dispensing end of the second embodiment of the present invention.

In addition to the alternative styles of mounting to a seed chute (not shown), embodiments of the invention also have alternative arrangements of the replaceable embedding portion of the firmer. FIG. 6 shows firmer 600 having embedding end 680 with spray nozzle 690 and extender 610. Firmer also has flat end 650 merging into flexible arm 640 which resiliently biases embedding end 680. Liquid, such as pesticide, herbicide, and/or fertilizer, may be directed proximate embedding end 680 by a flexible tube (not shown) being engaged with arm 675 and attaching to fixed tube 670. Fixed tube 670 extends through embedding end 680 to nozzle 690. FIG. 7 shows a view of embedding end 680 from the perspective of the trailing embedded seed. Extender 610 is the portion of firmer 600 pushing a seed (not shown in FIG. 7) into the ground. In this embodiment, embedding end 680 generally narrows to the general size of the seed, with nozzle 690 extending over the location of the embedded seed.

Figure 8A:
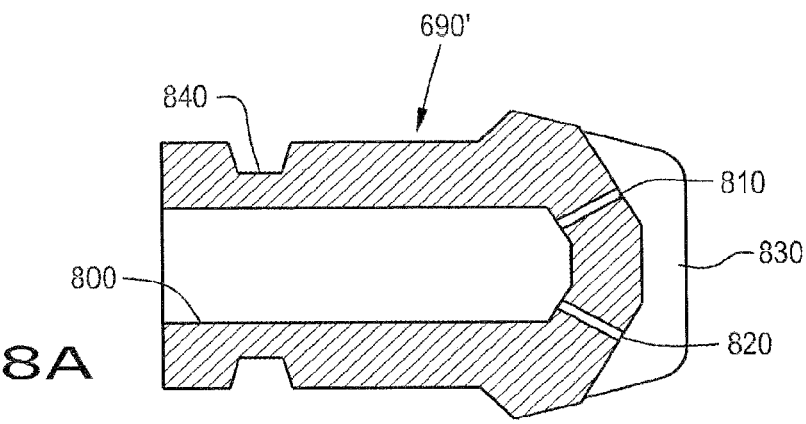
FIGS. 8A, 8B, and 8C are cross-sectional views of three embodiments of a liquid dispensing plug according to the present invention.
Figure 8B:
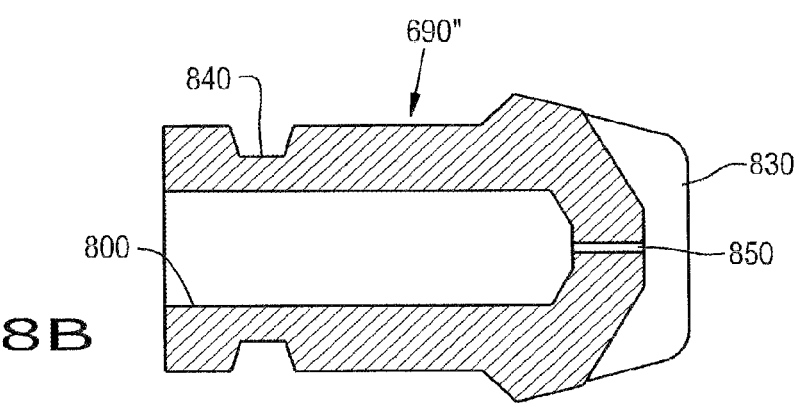
Figure 8C:
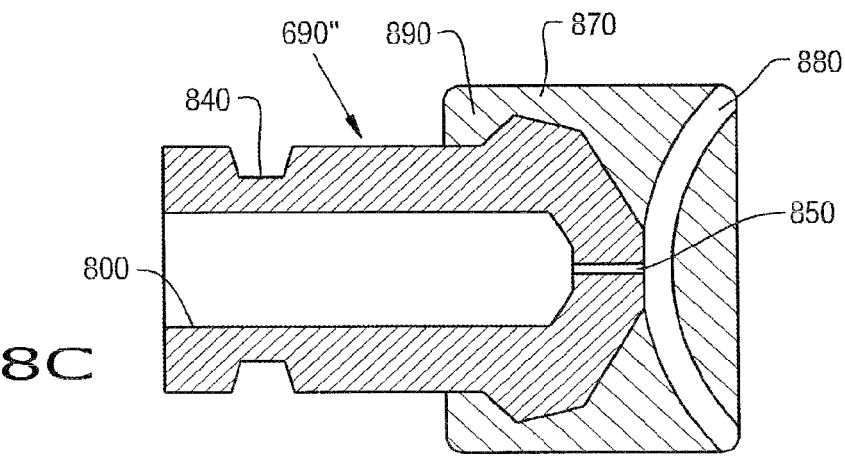

Firmer 600 may have alternative versions of nozzle 690. In the alternative embodiment of FIG. 8A, central bore 800 extends through cylindrically shaped nozzle 690' and terminates at angled passages 810 and 820, which are structured and arranged to direct liquid to a position offset from the seed. Flange 830 extends outward to shield the space through which angled passages 810 and 820 direct fluid. Valley 840 is located proximate the open end of central bore 800, and is structured and arranged to be engaged by a ridge or bump within embedding end 680 to secure the position of nozzle 690'. The alternative embodiment of FIG. 8B has central passage 850 for directing fluid onto the seed. A further alternative embodiment is shown in FIG. 8C, which includes splitter 692 that attaches over nozzle 690' so that fluid coming through central passage 850 is directed in other directions through splitter holes 694, for example with similar angles as passages 810 and 820 of the embodiment of FIG. 8A. The exact shape, size, and angle of splitter holes 694 may be varied for several unillustrated alternative embodiments of splitter 692.

In the embodiment of FIG. 6, extender 610 engages embedding end 680. One embodiment of the connection of extender 10 and embedding end 680 is depicted in the arrangement of FIG. 9. In this arrangement, embedding end 680 has T-shaped tongue 684 extending from stop portion 682 and below bottom surface 686. Tongue 684 is structured and arranged to match the contour of recess 614 of extender 610. Near the end of tongue 684 opposite stop 682, bottom surface 686 has a recess portion 688. Recess portion 688 is structured and arranged to engage with ribs 612 which extend from extender 610. The engagement of ribs 612 with recess portion 688 allows extender 610 to be slid onto tongue 684 without any impediment, and when stop end 616 of extender 610 nears stop portion 682, then ribs 612 are close to engagement with recess portion 688 and thus provides a slide in and lock procedure for securing extender 610 with embedding end 680.

Figure 11:
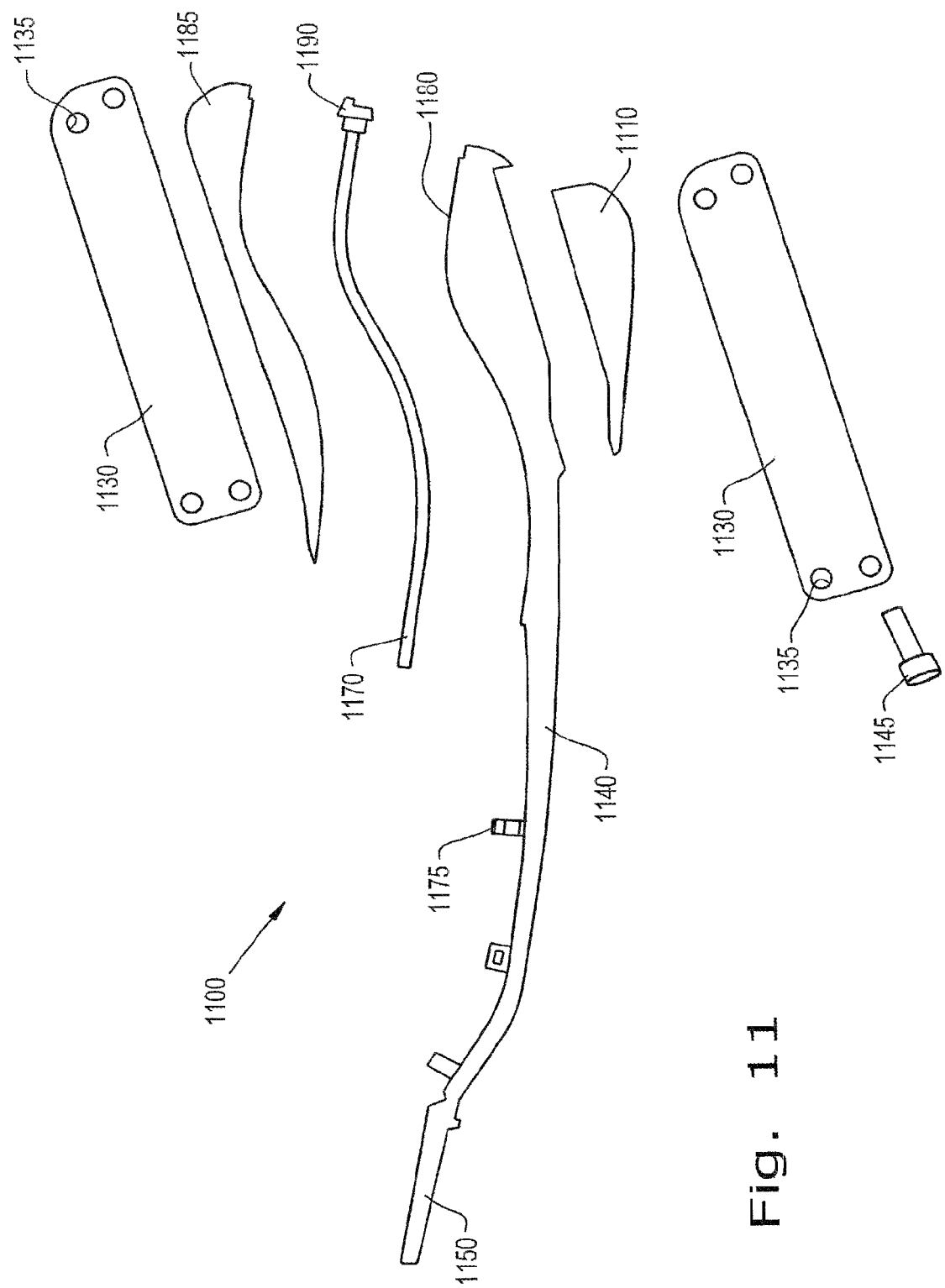
FIG. 11 is an exploded view of a fourth embodiment of the present invention.
Figure 12:
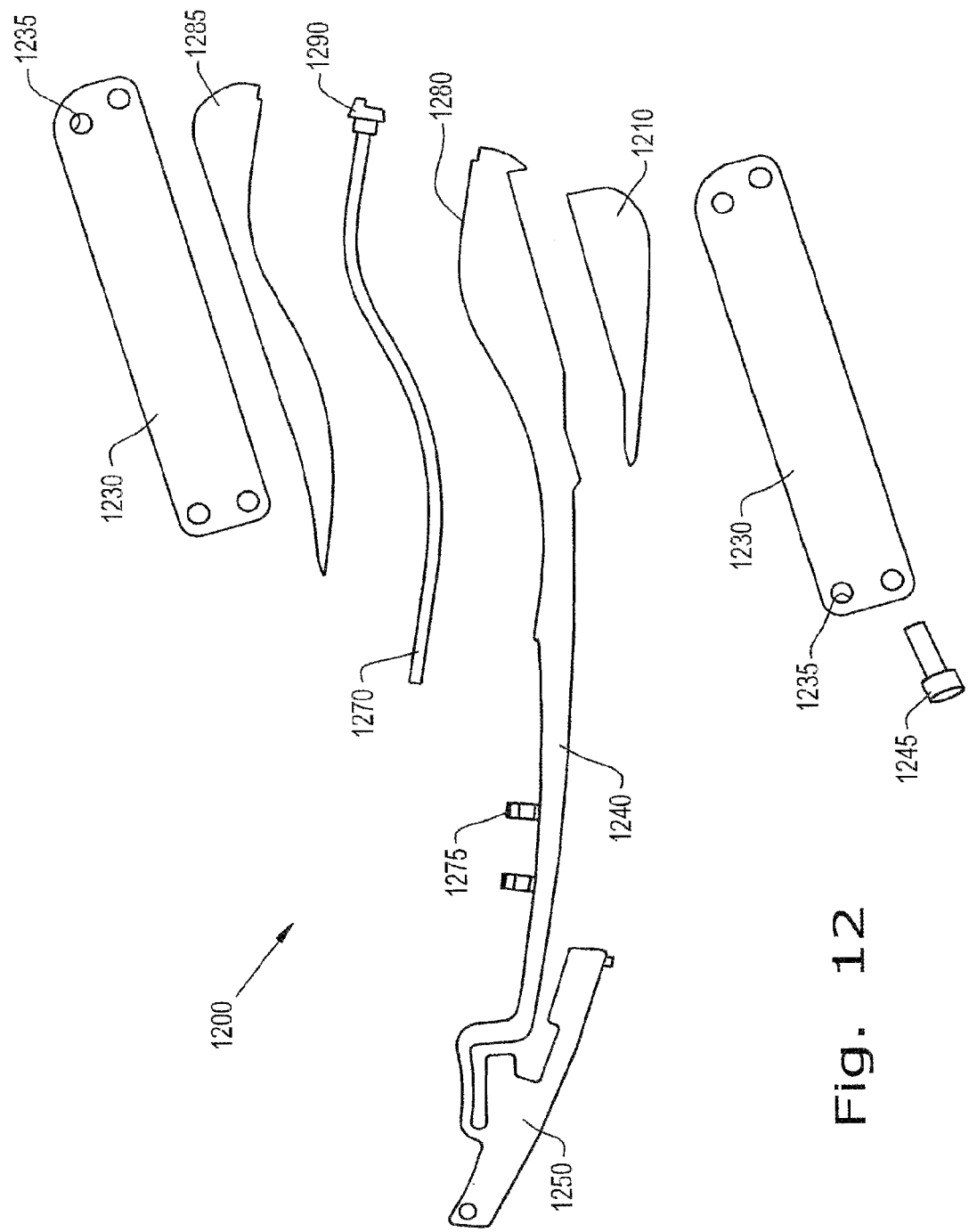
FIG. 12 is an exploded view of a fifth embodiment of the present invention.

Other embodiments of the invention involve the firmer having a central portion with attachment, flexing, and embedding portions connected together by a sandwiching arrangement between corresponding sidewalls, for example the embodiments of FIGS. 11 and 12. In the embodiment of FIG. 11, firmer 1100 has flat end 1150, central portion 1140, and embedding end 1180 formed in one integral piece. Pipe 1170 is disposed over embedding portion 1180, and under upper portion 1185, with extender 1110 abutting embedding portion 1180. Sidewalls 130 sandwich those components, and in some embodiments hold all together, using connectors 1145 received in sidewall holes 1135. In other unillustrated embodiments, extender 1110 may have a tongue-groove connection with embedding portion 1180, and be independent of, or alternatively sandwiched between, sidewalls 1130. Connectors 1145, which may be in the form of a screw, rod, putty, or other piece of connecting material and combinations of those, may secure sidewalls 1130 as sandwiching plates holding other components in their desired positions. In some embodiments, one or more connectors 1145 are releasable or otherwise alterable, while in other embodiments all connectors 1145 are fixed and engage sidewalls 1130, including extending through other components of firmer 1100. The embodiment of FIG. 12 has similar features to that of FIG. 11, with the exception that chute end 1250 being structured and arranged for connection to a conventional seed chute (not shown).

Figure 13:
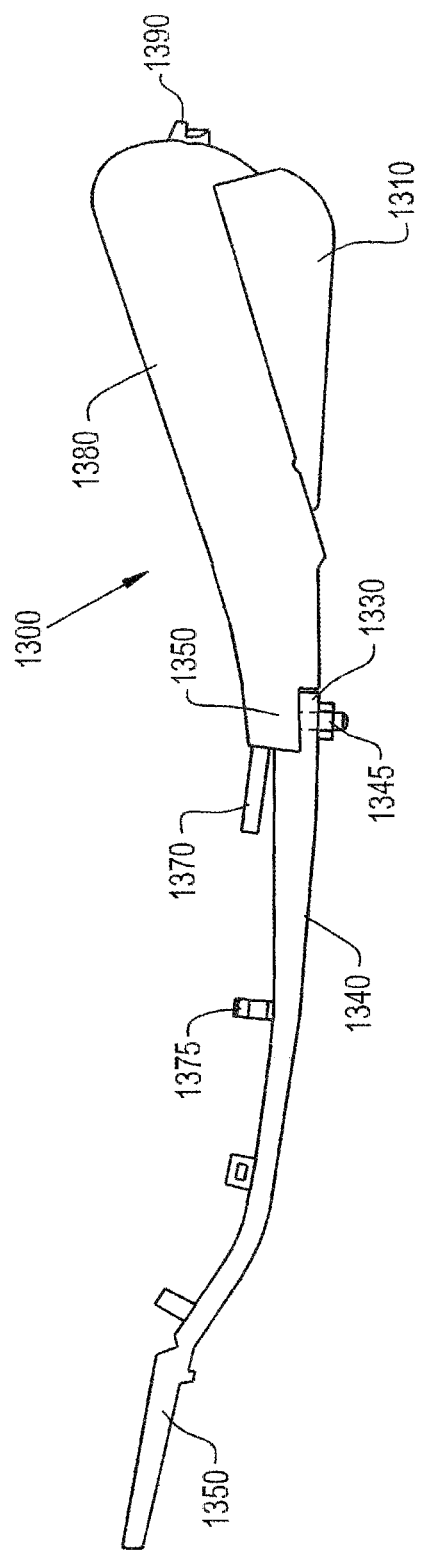
FIG. 13 is a side view of a sixth embodiment of the present invention.

A further embodiment having separate attaching and embedding portions is shown in FIG. 13. In this embodiment, flexible portion 1340 and flat end 1350 (which could in another embodiment be replaced by a chute end, not shown here) are formed as a single integral piece, and embedding arm 1380 is formed as a separate piece. In this embodiment, pipe 1370 extends from connection portion 1350 to spray nozzle 1390, and the bottom of connection portion 1350 abuts flange 1330 of flexible portion 1340. Extender 1310 is connected to embedding arm 1380 with a tongue and groove connection similar to some previous embodiments. Connector 1345, which may be in the form of a screw, rod, putty, or other piece of connecting material, extends through flange 1330 to couple with connection portion 1350. In alternative embodiments (not shown), pipe 1370 may enter embedding arm 1380 above the overlap with flexible portion 1340 so that connector 1345 in that embodiment is affixed from the top.

Figure 14:
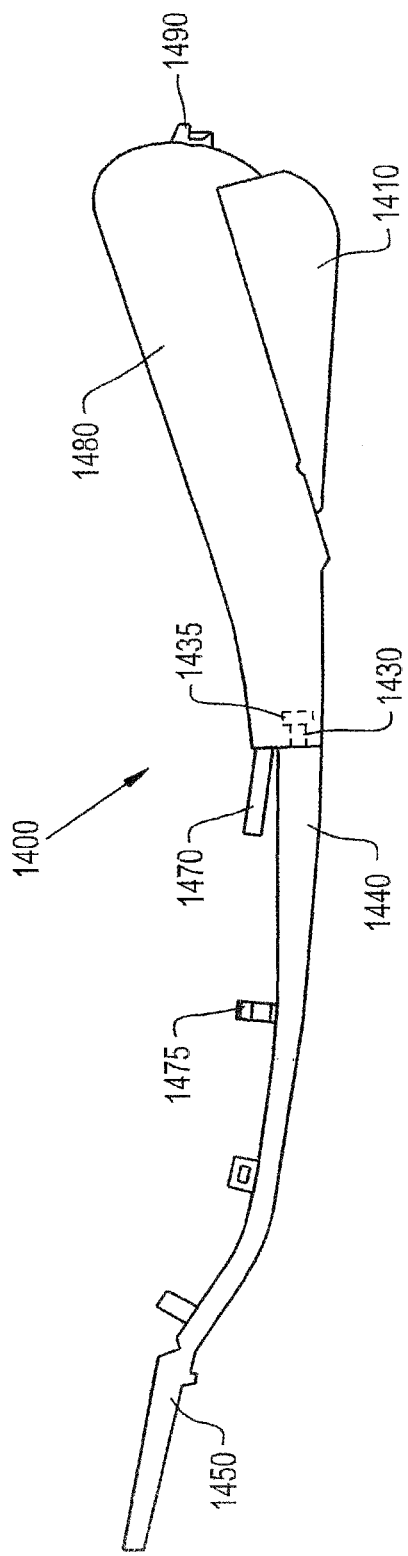
FIG. 14 is a side view of a seventh embodiment of the present invention.

Another embodiment shown in FIG. 14 has a two piece design for firmer 1400, with flexible portion 1440 having connection portion 1430 inserted into receiving portion 1435 or embedding portion 1480. In this embodiment, flat end 1450 may be alternatively shaped as a chute portion (not shown), and extender 1410 may be attached to embedding portion 1480 by a tongue and groove connection, or other connection.

Figure 15:
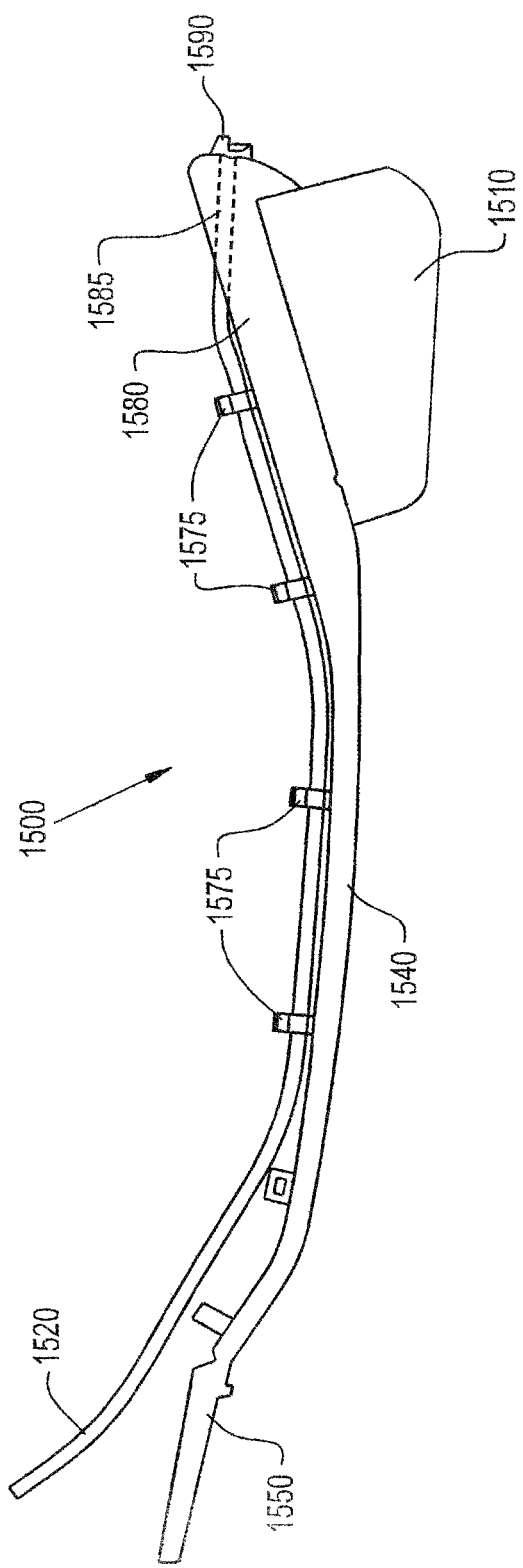
FIG. 15 is a side view of a eighth embodiment of the present invention.

An additional embodiment having a less substantial embedding portion is shown as firmer 1500 in FIG. 15. In this embodiment, flat end 1550 (which may alternatively be a chute end, not shown) has tube brackets 1575 disposed along flexible portion 1540 and embedding portion 1580 to provide for holding a tube (not shown) along the upper body of firmer 1500 to dispensing passage 1585 and spray nozzle 1590. Extender 1510, in this embodiment, may be attached to embedding portion 1580 via a tongue and groove connection, and is substantially thicker than those of the previous embodiments. This arrangement maximizes the size of replaceable extender 1510. Because of the greater size of extender 1510, the size of embedding portion 1580 is reduced. Thus, a pipe may not be feasible within embedding portion 1580, rather provision is made for attachment to flexible tube 1520. Flexible tube 1520 may be connected to a liquid delivery system (not shown) for dispensing water, nutrients, pesticides, and/or herbicides.

Figure 17:
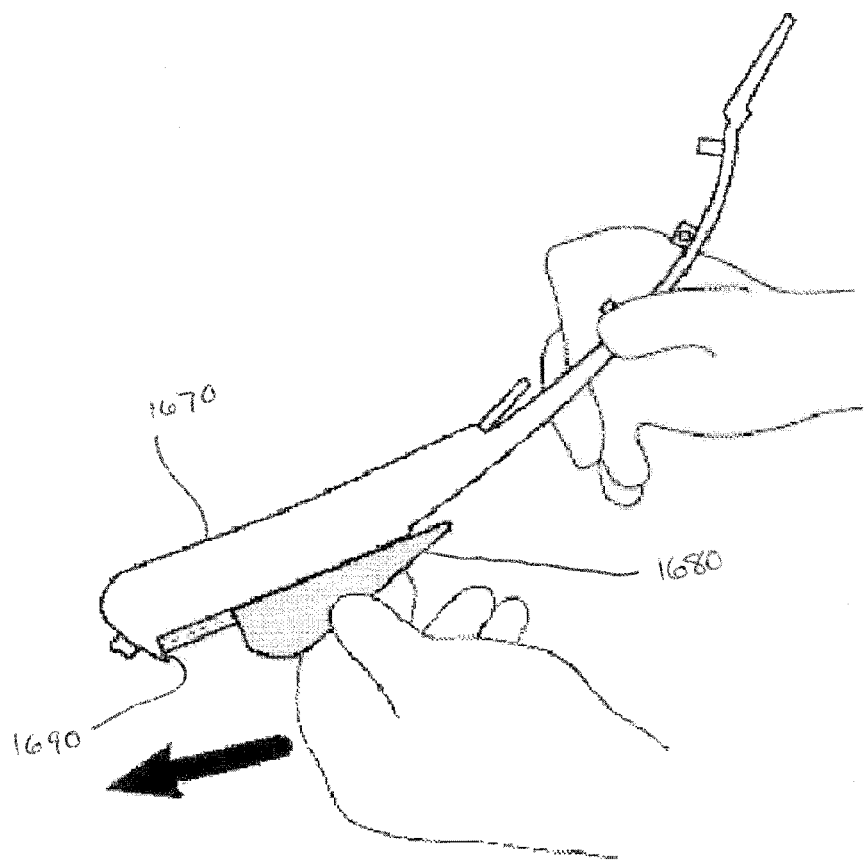
FIG. 17 depicts manual connection of the extender to the firmer according to one embodiment of the invention.

As described with respect to the previously disclosed embodiments, when the extender portion of a firmer becomes worn it can be replaced so as to prolong the useful life of the firmer. The extender may be replaced manually as is shown in FIG. 17. The exact details of how an extender is replaced varies from embodiment to embodiment, but generally the worn extender is removed from the firmer 1670 by sliding it away from the stop portion 1690. A new extender 1680 is then engaged with the firmer 1670 and moved into place until it contacts the stop portion 1690. Over time the extender may become warped, worn, or broken making it difficult to remove from the firmer by hand. Extenders and firmers which rely on an interference fit may be difficult to remove and attach even when new.

Figure 16:
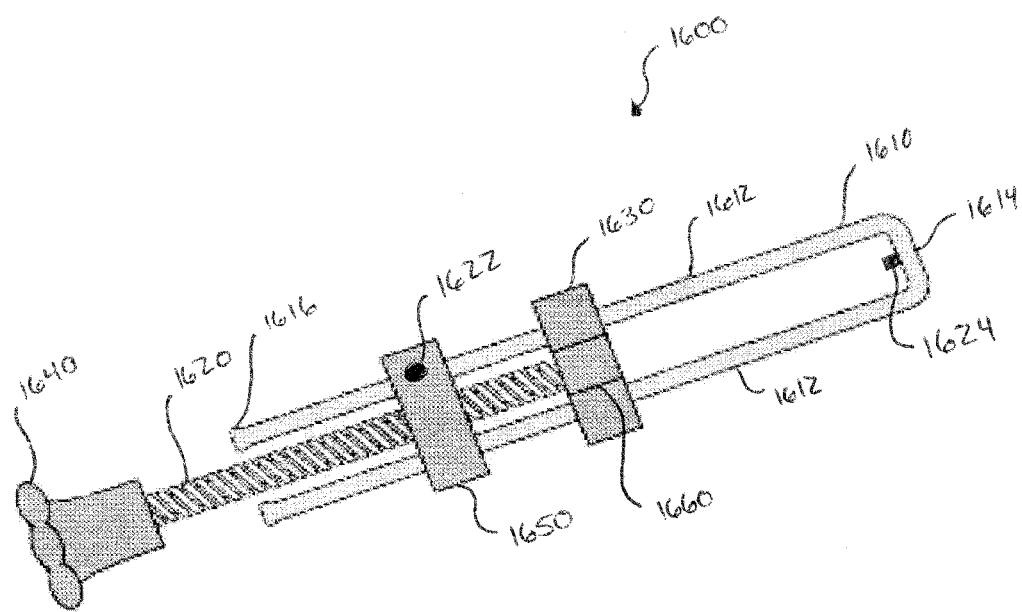
FIG. 16 is a top plan view of a firmer fastener according to one embodiment of the invention.

FIG. 16 shows the basic components of a tool for replacing extenders according to one embodiment of the present invention. The tool 1600 comprises a U-shaped bracket 1610, a threaded rod portion 1620, a threaded block 1650, and a sliding engagement head 1630. Threaded rod 1620 has a handle 1640 and threadedly extends through engagement head 1630 such that the rotation of handle 1640 causes the lateral movement of head 1630 along the u-shaped bracket 1610. Optionally, the handle 1640 is adapted to receive and be turned by an electric or cordless drill or other electric driver device. The U-shaped bracket includes two side rails 1612, a base rail 1614, and optionally rail stops 1616 which prevent threaded block 1650 and engagement head 1630 from being removed from the U-shaped bracket. Optionally, the base rail 1614 may include a pin, notch, or other securing feature 1624 designed to engage a corresponding inverse feature on a seed firmer to increase stability of the tool when in use. Threaded block 1650 may be fixed at a particular position along the side rails 1612 of the U-shaped bracket 1610, may be constructed as part of the bracket itself, or it may be selectively lockable so that it may be moved along the side rails 1612 to a desired position and locked into place for use. Such locking may be accomplished using a locking device 1622 such as set screws, clamps, hooks, pins, or the like. The engagement head 1630 may further include a slot or groove 1660 sized and adapted so as to allow the engagement head to better move along the surface of a firmer as will be described below.

Figure 18:
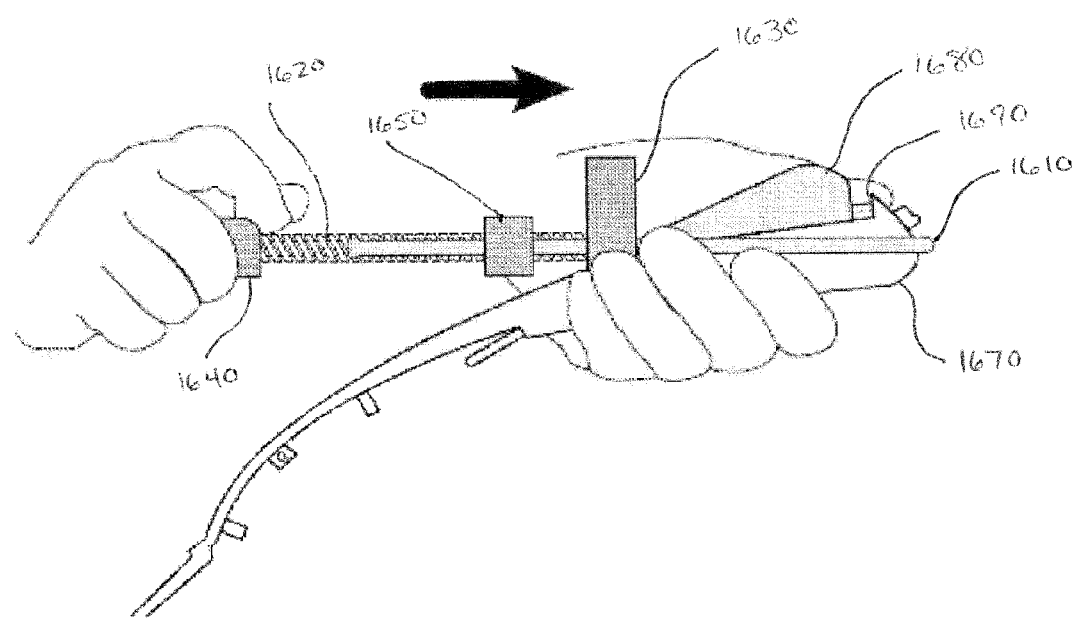
FIG. 18 depicts the use of one embodiment of the fastener tool to attach an extender according to one embodiment of the invention.

FIG. 18 shows how the tool 1600 shown in FIG. 16 may be used to attach an extender 1680 to a firmer 1670 according to one embodiment of the present invention. In this particular example, the U-shaped bracket 1610 is positioned so that the firmer 1670 is between the side rails 1612 and presses against the base rail 1614. A new extender 1680 is positioned such that it begins to engage with the firmer 1670. Optionally, the extender may be partially engaged with the firmer manually before using the tool. The threaded block 1650 is locked into position and the engagement head 1630 is brought into contact with the extender 1680. The handle 1640 is then turned which turns the threaded portion 1620 and urges the engagement head 1630 away from the threaded block 1650 and towards the base rail 1614 of the U-shaped bracket 1610, thereby pushing the extender 1680 onto the firmer 1670. The operation is complete when the extender 1680 contacts the stop 1690 of the firmer 1670. The tool is then removed and the firmer can be placed back on the planter. Optionally the procedure can be performed while the firmer is still connected to the planter. The components of the tool may be made from metal, plastic, rubber, composites, or any other suitable material or combination thereof.

Figure 19:
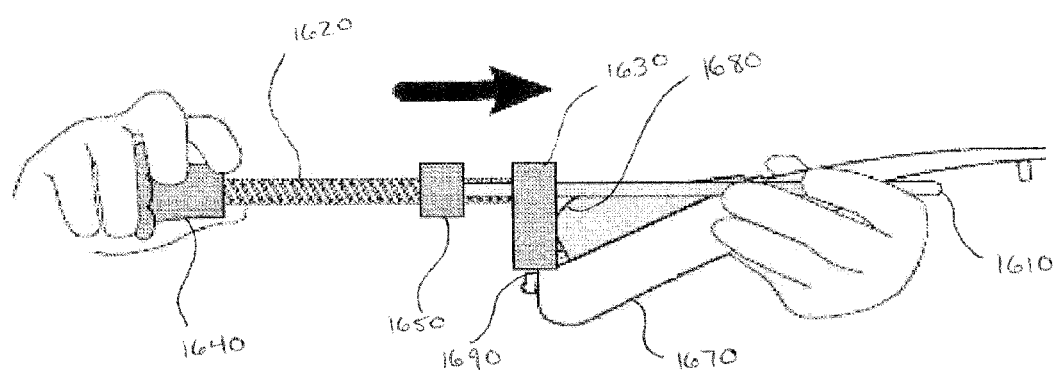
FIG. 19 depicts the use of one embodiment of the fastener tool to detach an extender according to one embodiment of the invention.

FIG. 19 shows the reverse arrangement for the removal of an extender 1680 from a firmer 1670 using a tool 1600 according to one embodiment of the present invention. In this example, the position of the threaded block 1650 and engagement head 1630 is adjusted so that the U-shaped bracket 1610 can be positioned around the firmer. The handle 1640 is then turned which moves the engagement head 1630 away from the threaded block 1650 and into contact with the extender 1680. As the handle 1640 is turned, the engagement head 1630 urges the extender 1680 away from the stop 1690 and off of the firmer 1670. The process may be continued until the extender is completely removed from the firmer or until it is sufficiently disengaged so as to allow for removal by hand. The tool is then removed and the firmer can be placed back on the planter after a new extender is installed. Optionally the procedure can be performed while the firmer is still connected to the planter.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A tool for manipulating an extender into and out of engagement with a seed firmer, comprising:
   a u-shaped bracket having a block with a threaded portion;
   a head portion slideably engaging the u-shaped bracket; and
   a threaded rod threadably engaging the u-shaped bracket and extending to the head portion;
   wherein rotation of the rod causes lateral movement of the head portion along the u-shaped bracket.

2. The tool of claim 1, wherein the head portion further includes a groove for engaging a seed firmer.

3. The tool of claim 1, wherein the u-shaped bracket and threaded rod are made of metal and the head portion is made of plastic.

4. The tool of claim 1, wherein the threated rod further includes a handle.

5. The tool of claim 4, wherein the handle is adapted to be turned by an electric drill.

6. The tool of claim 1, wherein the u-shaped bracket further includes a securing feature adapted to engage a seed firmer.

7. A tool for replacing an extender from a seed firmer, comprising:
   a u-shaped bracket portion;
   a threaded block portion slidably and lockably engaged with said u-shaped bracket portion;
   an engagement portion slidably engaged with said u-shaped bracket portion; and
   a threaded rod portion threadedly engaged with said threaded block portion and said engagement portion;
   wherein rotation of said threaded rod portion causes said engagement portion to slide laterally along said u-shaped bracket portion.

8. The tool of claim 7, wherein the threaded block portion further includes a groove for engaging a seed firmer.

9. The tool of claim 7, wherein the u-shaped bracket portion and threaded rod portion are made of metal and the head portion is made of plastic.

10. The tool of claim 7, wherein the u-shaped bracket portion further includes at least one rail stop.

11. The tool of claim 7, wherein the threated rod portion further includes a handle.

12. The tool of claim 11, wherein the handle is adapted to be turned by an electric drill.

13. The tool of claim 7, wherein the u-shaped bracket portion further includes a securing feature adapted to engage a seed firmer.

14. The tool of claim 7, wherein the threaded block portion further includes a locking device.

15. A tool for manipulating an extender into and out of engagement with a seed firmer, the seed firmer having a body with a groove for receiving an extender, the tool comprising:
   a u-shaped bracket having a block with a threaded portion;
   a head portion slideably engaging the u-shaped bracket; and
   a threaded rod threadably engaging the u-shaped bracket and extending to the head portion, the u-shaped bracket providing a space within which the seed firmer body may be at least partially disposed;
   wherein the rotation of the rod causes lateral movement of the head portion along the u-shaped bracket such that in one rotational direction the head portion may push an extender into engagement with the seed firmer body and in the other rotational direction the head portion may push the extender out of engagement with the seed firmer body.

16. The tool of claim 15, wherein the head portion further includes a groove for engaging a seed firmer.

17. The tool of claim 15, wherein the u-shaped bracket and threaded rod are made of metal and the head portion is made of plastic.

18. The tool of claim 15, wherein the threated rod further includes a handle.

19. The tool of claim 18, wherein the handle is adapted to be turned by an electric drill.

20. The tool of claim 15, wherein the u-shaped bracket further includes a securing feature adapted to engage a seed firmer.

* * * * *